(12) United States Patent
Upalekar et al.

(10) Patent No.: US 8,032,621 B1
(45) Date of Patent: *Oct. 4, 2011

(54) METHODS AND APPARATUS PROVIDING ROOT CAUSE ANALYSIS ON ALERTS

(75) Inventors: Sunil Ramchandra Upalekar, Milford, MA (US); Ravi Luhadiya, Shrewsbury, MA (US); Hanna Yehuda, Newton, MA (US); Serge G. Marokhovsky, Upton, MA (US); Serena M. Doyle, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1621 days.

This patent is subject to a terminal disclaimer.

(21) Appl. No.: 11/324,841

(22) Filed: Jan. 3, 2006

(51) Int. Cl.
 *G06F 15/173* (2006.01)
(52) U.S. Cl. ......... 709/223; 709/224; 370/241; 370/254
(58) Field of Classification Search .................. 709/223, 709/224; 702/182; 714/100; 715/733
 See application file for complete search history.

(56) References Cited

U.S. PATENT DOCUMENTS

| 6,892,264 | B2* | 5/2005 | Lamb ............................ 710/301 |
| 7,076,688 | B2* | 7/2006 | Yamamoto ....................... 714/6 |
| 7,113,988 | B2* | 9/2006 | Chirashnya et al. .......... 709/224 |
| 7,397,770 | B2* | 7/2008 | Le et al. ........................ 370/254 |
| 2003/0130821 | A1* | 7/2003 | Anslow et al. ............... 702/186 |
| 2004/0059807 | A1* | 3/2004 | Klotz et al. ................... 709/223 |
| 2006/0215564 | A1* | 9/2006 | Breitgand et al. ............ 370/241 |

* cited by examiner

*Primary Examiner* — Yves Dalencourt
(74) *Attorney, Agent, or Firm* — Krishnendu Gupta; Gerald P. Kazanjian

(57) ABSTRACT

A system displays a set of alerts in an alert view. Each alert indicates a problem associated with a managed resource operating in a storage area network. The system receives a selection of an alert from the alert view, and performs an analysis of managed resource data associated with the managed resource experiencing the alert to identify performance details concerning the alert in relation to the managed resource data. The system then presents the performance details associated with the alert in a performance view. The performance view includes a topology region identifying a location of the managed resource experiencing the alert within the storage area network, and a graph region identifying the alert in relation to managed resource data for the managed resource experiencing the alert.

21 Claims, 10 Drawing Sheets

215 PRESENT THE PERFORMANCE DETAILS ASSOCIATED WITH THE ALERT IN A PERFORMANCE VIEW, THE PERFORMANCE VIEW INCLUDING A TOPOLOGY REGION IDENTIFYING A LOCATION OF THE MANAGED RESOURCE EXPERIENCING THE ALERT WITHIN THE STORAGE AREA NETWORK, AND A GRAPH REGION IDENTIFYING THE ALERT IN RELATION TO MANAGED RESOURCE DATA FOR THE MANAGED RESOURCE EXPERIENCING THE ALERT

216 DETERMINE A DETAIL LEVEL AT WHICH TO DISPLAY MANAGED RESOURCES WITHIN THE PERFORMANCE VIEW, THE DETAIL LEVEL DETERMINED FROM PERFORMANCE DETAILS ASSOCIATED WITH THE SELECTED ALERT

↓

217 DISPLAY A PLURALITY OF SELECTABLE MANAGED RESOURCE DATA ASSOCIATED WITH THE MANAGED RESOURCE AT THE DETERMINED DETAIL LEVEL

↓

218 GRAPHICALLY DISPLAY CONNECTIVITY BETWEEN THE PLURALITY OF SELECTABLE MANAGED RESOURCE DATA ASSOCIATED WITH THE MANAGED RESOURCE

OR

219 RECEIVE MODIFICATION TO A VIEW MODIFIER RELEVANT TO AT LEAST ONE OF THE TOPOLOGY REGION AND THE GRAPH REGION

↓

220 IN RESPONSE, UPDATE THE TOPOLOGY REGION AND THE GRAPH REGION TO ACCOUNT FOR THE MODIFICATION OF THE VIEW MODIFIER

*FIG. 7*

METHODS AND APPARATUS PROVIDING ROOT CAUSE ANALYSIS ON ALERTS

BACKGROUND

Conventional computer networks allow a network manager or operator to add or modify new or existing network elements such as switches, routers, hubs, servers, disks, and other devices. As an example, in a conventional storage area network (SAN), one or more storage arrays having very large amounts of data storage capacity are connected through connectivity devices, such as switches, to host computer systems that operate as servers of data to client computer systems that request the data from the storage arrays. Thus, the storage area network is a network that interconnects host, connectivity and storage elements in a storage environment, and ensures fault-free and timely access to the data for client users via the host servers. In the storage area network, a conventional storage area network management application is employed to monitor and control (i.e., to manage) the host, connectivity and storage elements in the network. Management of the storage area network by the network management application allows optimal usage and throughput in the storage area network by identifying areas of contention, reporting malfunctions, providing access control, and allocating ports and data flow paths between the host and storage devices in the storage area network.

Certain conventional storage area network management applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

SUMMARY

Conventional technologies for graphical user interface-based storage area network management applications suffer from a variety of deficiencies. In particular, conventional technologies for graphical user interface-based storage area network management applications are limited in that they do not provide a root cause analysis of problems, nor do they analyze performance of remote devices in the storage area network, presenting the most relevant information to a user. That is, in operation of conventional storage area network management applications, the user is not presented a graphical representation of the root cause of a problem, and a graphical representation of performance analysis related to that problem, with the most relevant aspects of the problem highlighted for the user. Performance analysis is important because in a typical storage area network, there may be many hundreds or thousands of a particular managed resource, such as a disk device, connected together. Pinpointing the root cause of a problem can be difficult, if not time consuming. Root cause analysis allows a user to quickly locate the source of a problem, and performance analysis allows a user to view performance over a specified period of time to gain a better perspective of problem trends.

In contrast to conventional technologies, embodiments disclosed herein include a network management information process that allows a user to select a managed resource from a hierarchical display, and filter the list of alerts associated with that managed resource to view (within an alerts view) only those alerts that fit a criteria specified by the user. The list of filtered alerts includes a managed resource identifier, information related to the alert, and a timestamp of when the alert occurred. A user can select one of the alerts in the list to view performance details associated with the alert within a performance view.

The performance view contains a topology region and a graph region. The topology region displays a topology of the system as it relates to the alert at a detail level that is relevant to a user viewing the alert. The graph region displays a graphical depiction (over a specified period of time) of the alert, and highlights an area in the graph where the alert occurred. The user can select the highlighted area to view additional information (i.e., a value associated with the alert and a timestamp of the alert). The graph region also displays a performance metric that includes information related to a performance limit. The performance limit specifies a threshold at which an alert will be triggered.

Both the topology region and the graph region contain view modifiers that allow a user to modify aspects of both regions. The view modifiers are pre-populated for the user to display aspects of the topology region and graph region that are most relevant to user (as those aspects relate to the user selected alert).

Embodiments disclosed herein significantly overcome deficiencies of conventional technologies and provide a system that includes a computer system executing a network management information process that displays a set of alerts in an alert view. Each alert indicates a problem associated with a managed resource operating in a storage area network. The network management information process receives a selection of an alert from the alert view, and performs an analysis of managed resource data associated with the managed resource experiencing the alert, to identify performance details concerning the alert in relation to the managed resource data. The network management information process presents the performance details associated with the alert in a performance view including a topology region, and a graph region. The topology region identifies a location of the managed resource experiencing the alert within the storage area network. The graph region identifies the alert in relation to managed resource data for the managed resource experiencing the alert.

During an example operation of one embodiment, suppose a user, for example, a storage area network administrator, needs to analyze the root cause of an alert for a host on a storage area network. The storage area network administrator selects the host from a hierarchical display, and selects the alert view from the graphical user interface. From the list of all alerts associated with the selected host, the storage area network administrator can enter parameter values into filter components (such as a time frame in which the alerts occurred) to filter the list of alerts to view on those alerts that are relevant to the storage area network administrator. The storage area network administrator selects an alert from the filtered list of alerts to view performance details within the performance view.

The performance view contains a topology region and a graph region. The topology region displays the selected host, other resources within the storage area network, and the connectivity between the selected host and the other displayed resources. The graph region displays a graphical depiction of the behavior of the selected host over a period of time, including the time the alert occurred. The time the alert occurred is highlighted within the graphical depiction, and the storage area network administrator can view additional information (such as the time the alert occurred and a value associated with the alert).

Both the topology region and a graph region contain view modifiers that are pre-populated to display the topology region and graph region at a level of detail most relevant to the alert. The storage area network administrator can modify the view modifiers, and refresh the data in the topology region and the graph region, to view new details related to the topology region and the graph region.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 7 illustrates a flowchart of a procedure performed by the system of FIG. 1 when the network management information process presents the performance details associated with the alert in a performance view, according to one embodiment disclosed herein.

DETAILED DESCRIPTION

Embodiments disclosed herein include methods and a computer system that perform a network management information process within a graphical user interface that allows a user to select a managed resource from a hierarchical display, and filter the list of alerts associated with that managed resource to view (within an alerts view) only those alerts that fit a criteria specified by the user. The list of filtered alerts includes a managed resource identifier, information related to the alert, and a timestamp of when the alert occurred. A user can select one of the alerts in the list to view performance details associated with the alert within a performance view.

The performance view contains a topology region and a graph region. The topology region displays a topology of the system as it relates to the alert at a detail level that is relevant to a user viewing the alert. The graph region displays a graphical depiction, over a specified period of time, of the alert, and highlights an area in the graph where the alert occurred. The graph region also displays a performance metric that includes information related to a performance limit. The performance limit specifies a threshold at which an alert will be triggered.

Both the topology region and the graph region contain view modifiers that allow a user to modify aspects of both regions. The view modifiers are pre-populated for the user to display aspects of the topology region and graph region that are most relevant to user as those aspects relate to the user selected alert.

Figure 1:
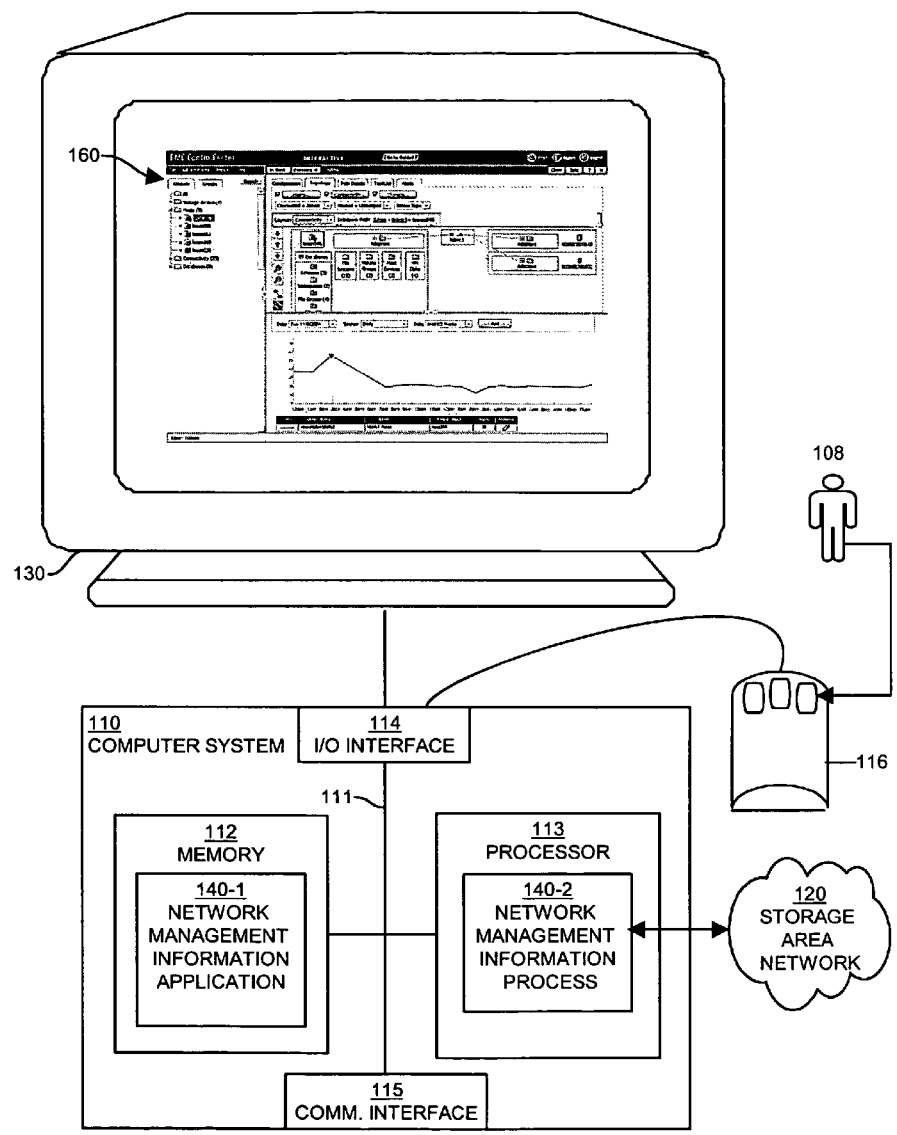
FIG. 1 shows a high-level block diagram of a computer system according to one embodiment disclosed herein.

FIG. 1 is a block diagram illustrating example architecture of a computer system 110 that executes, runs, interprets, operates or otherwise performs an network management information application 140-1 and network management information process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the network management information application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers, switches, routers, hubs, servers, disks, other devices, etc.) on a storage area network 120.

The memory system 112 is any type of computer readable medium, and in this example, is encoded with a network management information application 140-1 as explained herein. The network management information application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the network management information application 140-1. Execution of the network management information application 140-1 in this manner produces processing functionality in a network management information process 140-2. In other words, the network management information process 140-2 represents one or more portions or runtime instances of the network management information application 140-1 (or the entire network management information application 140-1) performing or executing within or upon the processor 113 in the computerized device 110 at runtime.

It is noted that example configurations disclosed herein include the network management information application 140-1 (i.e., in the form of un-executed or non-performing logic instructions and/or data). The network management information application 140-1 may be stored on a computer readable medium (such as a floppy disk), hard disk, electronic, magnetic, optical, or other computer readable medium. The network management information application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the network management information application 140-1 in the processor 113 as the network management information process 140-2. Those skilled in the art will understand that the computer system 110 may include other processes and/or software and hardware components, such as an operating system not shown in this example.

A display 130 need not be coupled directly to computer system 110. For example, the network management information application 140-1 can be executed on a remotely accessible computerized device via the network interface 115. In this instance, the graphical user interface 160 may be displayed locally to a user 108 of the remote computer and execution of the processing herein may be client-server based.

Figure 2:
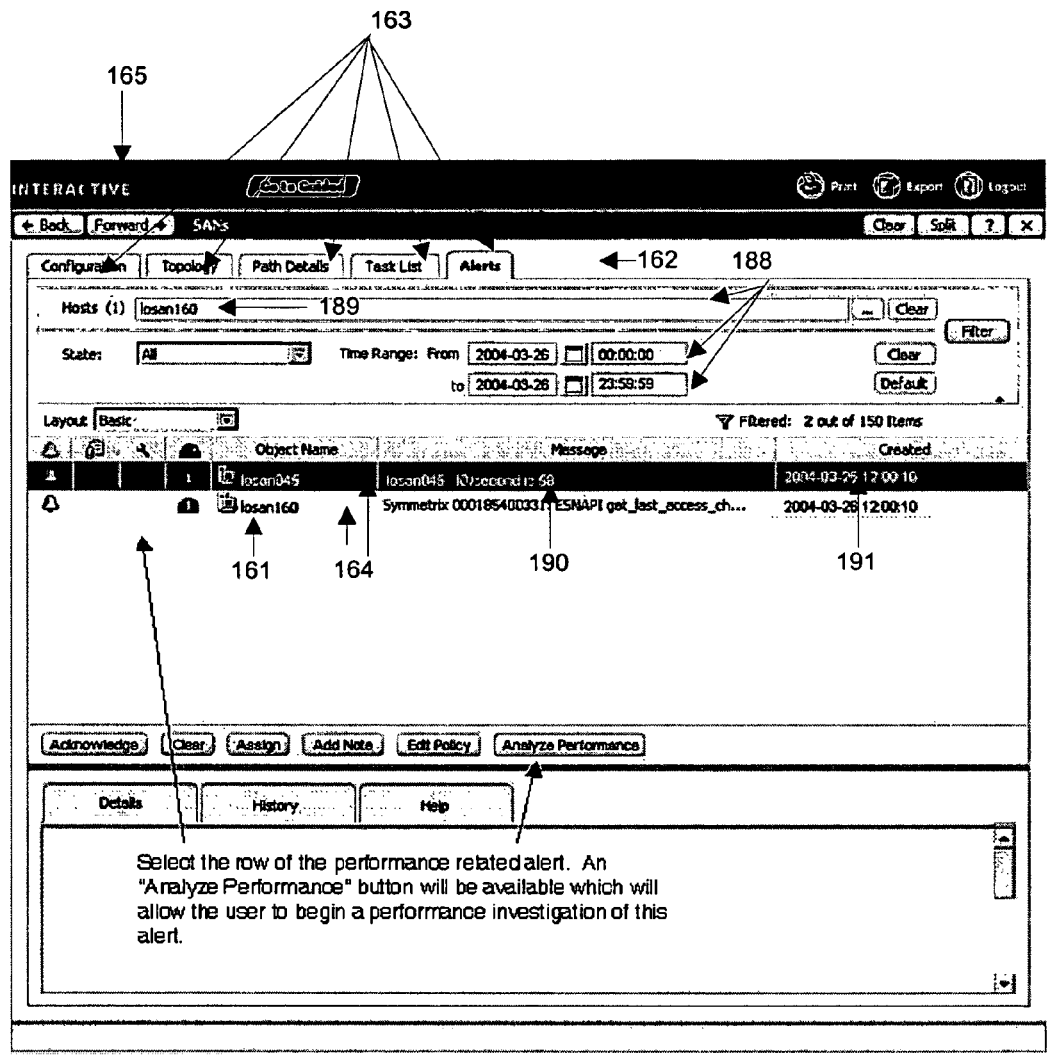
FIG. 2 shows an example screenshot of an alert view containing filtered alerts, according to one embodiment disclosed herein.

FIG. 2 is a screenshot example of the graphical user interface 160 displaying an alert view 165. The alert view 165 displays a selectable view region 162 where a user 108 has selected the alert view 165 from the available views 163. A user enters parameter values 189 into filter components 188 to produce a filtered list of alerts 164. Each alert displays an identity of a managed resource 161, a type of alert 190, and a timestamp 191 of when the alert occurred.

Figure 3:
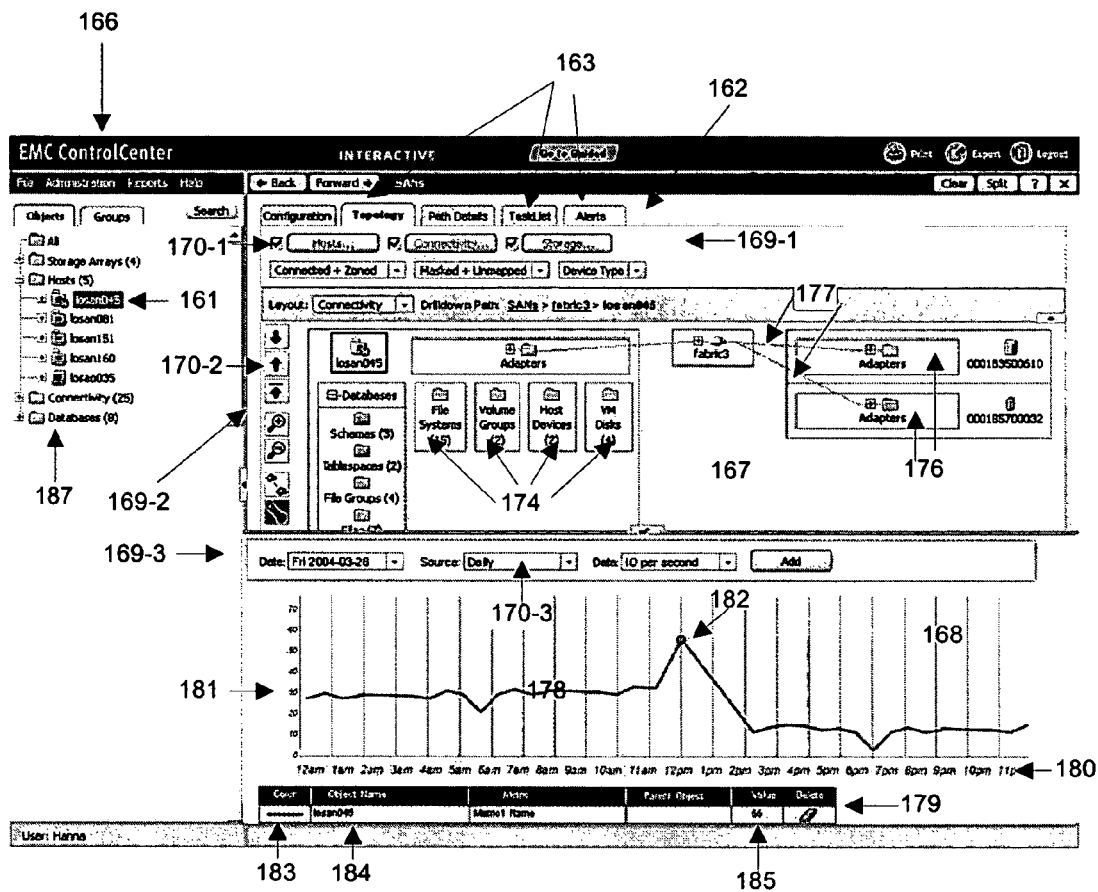
FIG. 3 shows an example screenshot of a performance view containing performance details, according to one embodiment disclosed herein.

FIG. 3 is a screenshot example of the graphical user interface 160 displaying a performance view 166. The performance view 166 contains views 163 within a selectable view region 162. A view modifier region 169 contains view modifiers 170. Details of a managed resource 161 displayed within a hierarchical display 187 are shown within a topology region 167 and graph region 168. The topology region 168 displays a plurality of resources 174 and storage resources 176 graphically displayed with their associated connectivity 177. The graph region 168 displays a graphical depiction 178 of performance details, including an area 182 in the graph region 168 where the alert 164 occurred. The graphical depiction 178 is displayed with a scale 181 and a timeline 180. Also displayed within the graph region 168 is a performance detail metric 179 containing a legend 183, a managed resource identifier 184, and a performance limit 185.

Further details of configurations explained herein will now be provided with respect to a flow chart of processing steps that show the high level operations disclosed herein to perform the network management information process 140-2.

Figure 4:
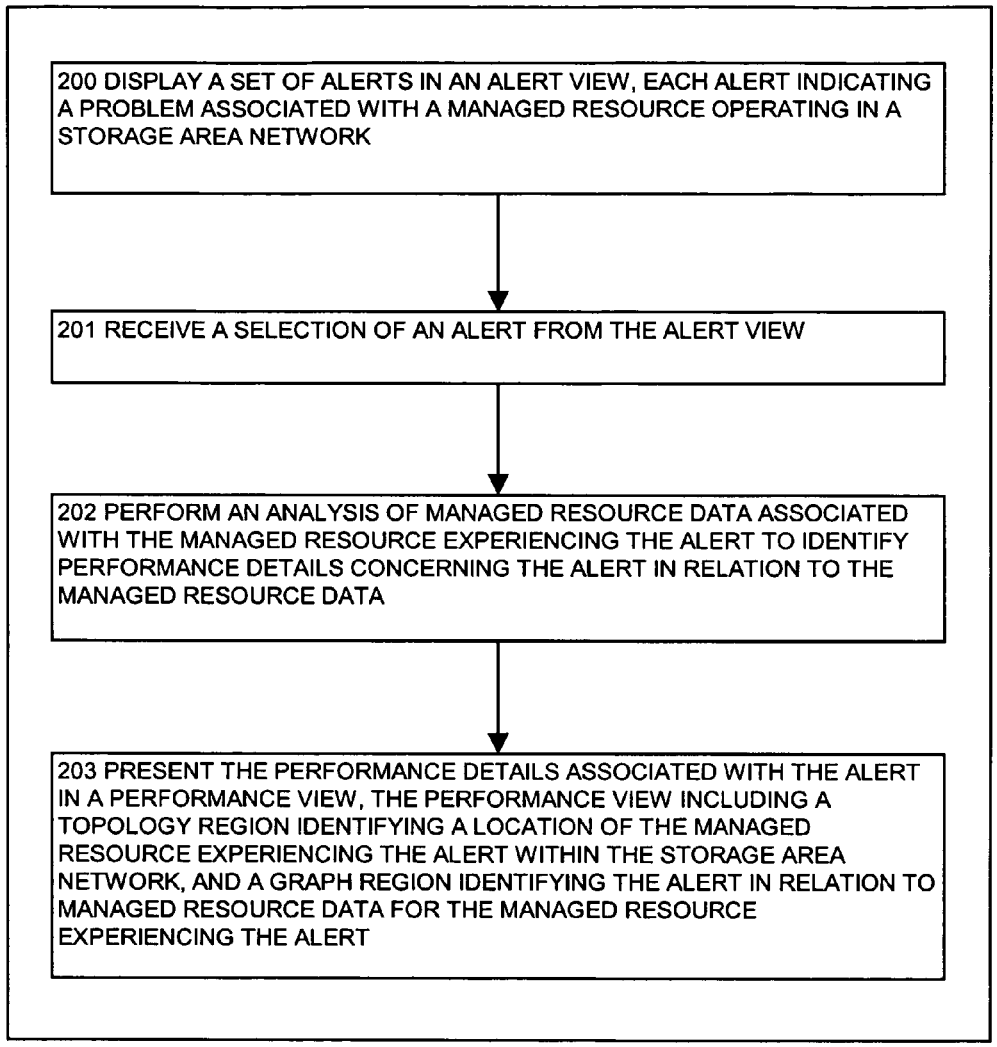
FIG. 4 illustrates a flowchart of a procedure performed by the system of FIG. 1 when the network management information process displays a set of alerts in an alert view, each alert indicating a problem associated with a managed resource operating in a storage area network, according to one embodiment disclosed herein.

FIG. 4 is a flowchart of the steps performed by the network management information process 140-2 when it displays a set of alerts 164, receives a selection of an alert 164 and presents performance details related to the selected alert 164.

In step 200, the network management information process 140-2 displays a set of alerts 164 in an alert view 165, each alert 164 indicating a problem associated with a managed resource 161 operating in a storage area network 120. For example, a user 108 wishes to view all alerts 164 related to a managed resource 161 that occurred during a specific day, such as Mar. 26, 2004 as shown in FIG. 2. The user 108 fills in filter components 188, such as a "Time Range: From" and "Time Range: To" with parameter values 189, to produce a filtered list of alerts 164 that occurred during the date of Mar. 26, 2004.

In step 201, the network management information process 140-2 receives a selection of an alert 164 from the alert view 165. For example, a user 108 selects an alert 164 from the list of filtered alerts 164. In an example configuration, the act of selecting the alert 164 enables an "Analyze Performance" button that a user 108 can select to view performance details. In another example configuration, a user 108 simply 'double clicks' on a selected alert 164 to view the performance details. In yet another example configuration, the type of alert 164 (i.e., hardware alert, agent alert, performance alert, etc) determines a type of analysis action (i.e., "Analyze Hardware", "Analyze Agent", "Analyze Performance", etc) that is enabled for a user 108 to select to view additional analysis details related to that selected alert 164.

In step 202, the network management information process 140-2 performs an analysis of managed resource data associated with the managed resource 161 experiencing the alert 164 to identify performance details concerning the alert 164 in relation to the managed resource data. The performance details can include a type of alert 164, alert details and/or a timestamp of when the alert 164 occurred.

In step 203, the network management information process 140-2 presents the performance details associated with the alert 164 in a performance view 166. The performance view 166 includes a topology region 167 identifying a location of the managed resource 161 experiencing the alert 164 within the storage area network 120, and a graph region 168 identifying the alert 164 in relation to managed resource data for the managed resource 161 experiencing the alert 164.

Figure 5:
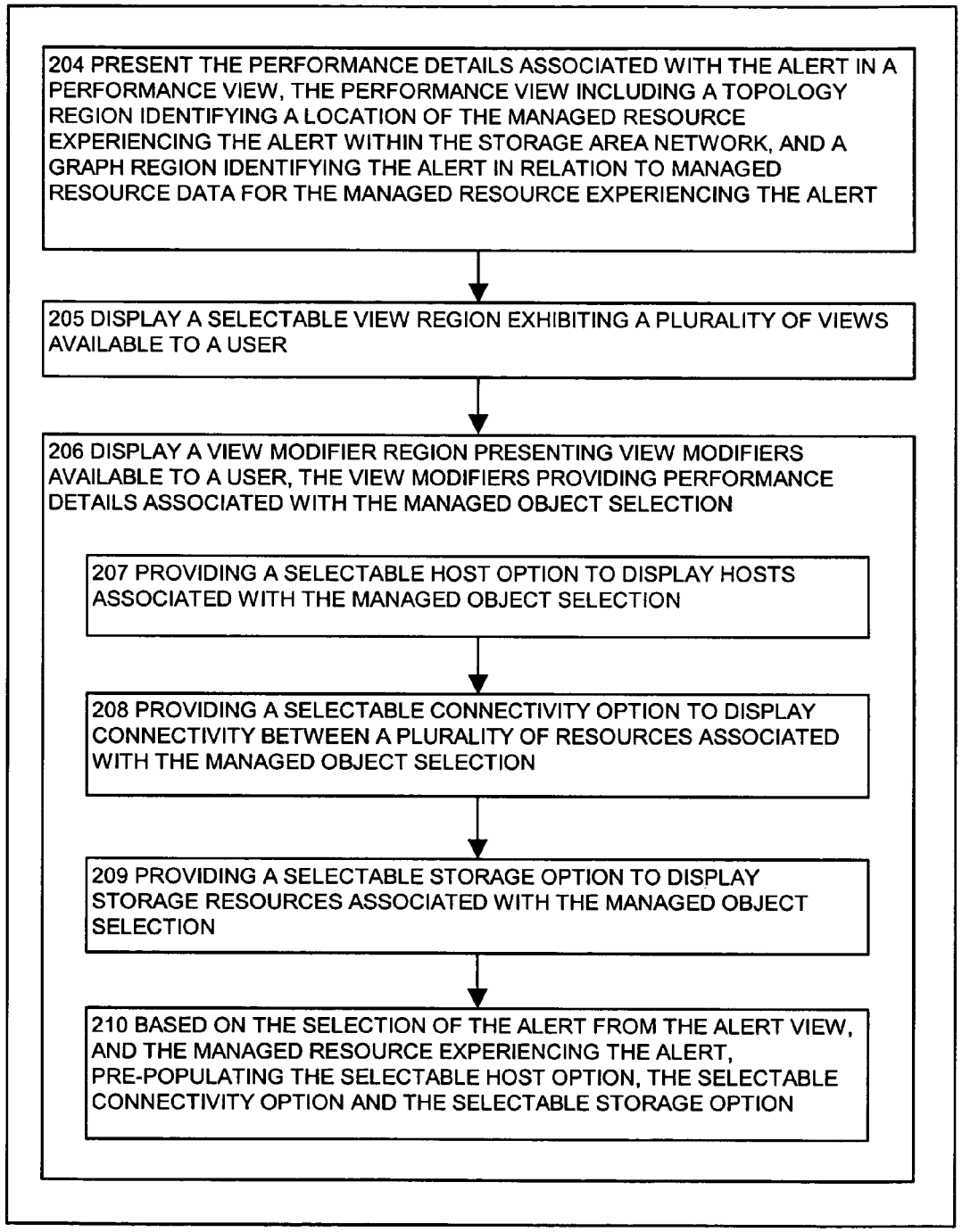
FIG. 5 illustrates a flowchart of a procedure performed by the system of FIG. 1 when the network management information process presents the performance details associated with the alert in a performance view, according to one embodiment disclosed herein.

FIG. 5 is a flowchart of the steps performed by the network management information process 140-2 when it pre-populates view modifiers 170 in the performance view 166.

In step 204, the network management information process 140-2 presents the performance details associated with the alert 164 in a performance view 166. The performance view 166 includes a topology region 167 identifying a location of the managed resource 161 experiencing the alert 164 within the storage area network 120, and a graph region 168 identifying the alert 164 in relation to managed resource data for the managed resource 161 experiencing the alert 164.

In step 205, the network management information process 140-2 displays a selectable view region 162 exhibiting a plurality of views 163 available to a user 108. In an example configuration, the views 163 include a configuration view, a topology view, a path details view, an alerts view 165, and a task list view. In another example configuration, the network management information process 140-2 identifies the topology view as the selected view 163, based on the selection of the alert 164 from the alert view 165, and the managed resource 161 experiencing the alert 164.

In step 206, the network management information process 140-2 displays a view modifier region 169-N presenting view modifiers 170-N available to a user 108. The view modifiers 170-N provide performance details associated with the managed object selection 161. For example, the view modifiers 170-N allow a user 108 to customize the performance details displayed within the topology region 167 and the graph region 168.

In step 207, the network management information process 140-2 provides a selectable host option to display hosts associated with the managed object selection. In an example configuration, the selectable host option is a Boolean option; that is, the user 108 can choose to either view the hosts within the topology region 167 or not view the hosts within the topology region 167.

In step 208, the network management information process 140-2 provides a selectable connectivity option to display connectivity 177 between a plurality of resources 174 associated with the managed object selection 161. In an example configuration, the selectable connectivity option is a Boolean option; that is, the user 108 can choose to either view the connectivity 177 within the topology region 167 or not view the connectivity 177 within the topology region 167.

In step 209, the network management information process 140-2 provides a selectable storage option to display storage resources 176 associated with the managed object selection 161. In an example configuration, the selectable storage option is a Boolean option; that is, the user 108 can choose to either view the storage resources 176 within the topology region 167 or not view the storage resources 176 within the topology region 167.

Based on the selection of the alert 164 from the alert view 165, and the managed resource 161 experiencing the alert 164, in step 210, the network management information process 140-2 pre-populates the selectable host option, the selectable connectivity option, and the selectable storage option. In an example configuration, the network management information process 140-2 determines which of these view modifiers 170-N (i.e., the selectable host option, the selectable connectivity option, and the selectable storage option) are most relevant to the user 108, based on the managed resource 161 selected and the selected alert 164 associated with that selected managed resource 161, and selects those view modifiers 170-N accordingly.

Figure 6:
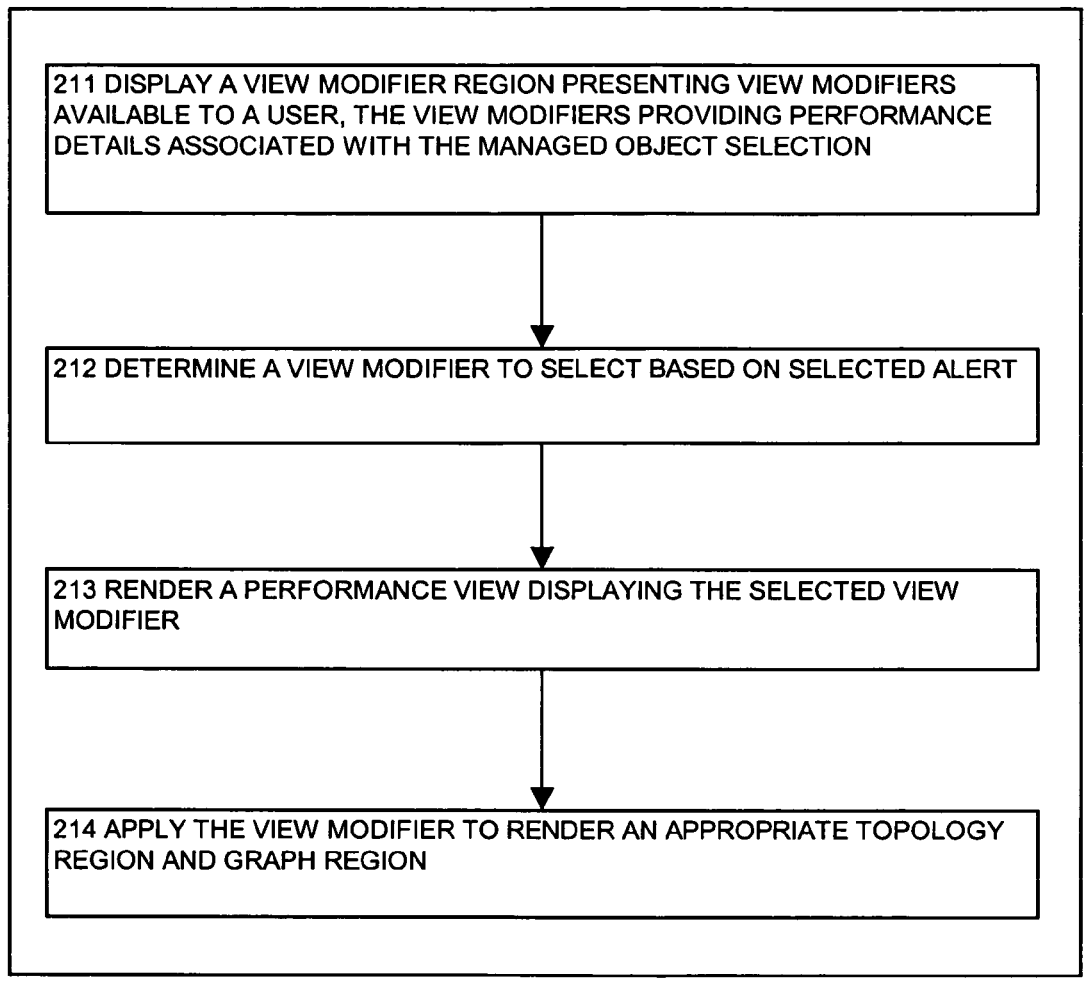
FIG. 6 illustrates a flowchart of a procedure performed by the system of FIG. 1 when the network management information process displays a view modifier region presenting view modifiers available to a user, the view modifiers providing performance details associated with the managed object selection, according to one embodiment disclosed herein.

FIG. 6 is a flowchart of the steps performed by the network management information process 140-2 when it determines a view modifier 170 to select based on the selected alert 164, and then renders the performance view 166 based on that view modifier 170.

In step 211, the network management information process 140-2 displays a view modifier region 169-N presenting view modifiers 170-N available to a user 108. The view modifiers 170-N provide performance details associated with the managed object selection 161. In an example configuration, the view modifiers 170-1 relate to the managed resource data to display within the topology region 167. In another example configuration, the view modifiers 170-2 relate to viewing various detail levels (for example, zoom in, zoom out, etc) related to the topology region 167. In yet another configuration, the view modifiers 170-3 relate to viewing performance details within the graph region 168.

In step 212, the network management information process 140-2 determines a view modifier 170-3 to select based on selected alert 164. For example, the network management information process 140-2 determines the most relevant data related to the selected alert 164 can be shown on a daily level, and modifies the "Source:" view modifier 170-3 to display a graphical depiction 178 on a daily level.

In response, in step 213, the network management information process 140-2 renders a performance view 166 displaying the selected view modifier 170-3. For example, the network management information process 140-2 renders the "Source:" view modifier 170-3 to display the chosen "Daily" level.

In step 214, the network management information process 140-2 applies the view modifier 170-3 to render an appropriate topology region 167 and graph region 168. In an example configuration, the network management information process 140-2 renders the graph region 178 to show the graphical depiction 178 on a daily level specified by the "Source:" view modifier 170-3, and also renders the topology region 167 to display the most relevant topology information related to the newly rendered graphical depiction 178.

FIG. 7 is a flowchart of the steps performed by the network management information process 140-2 when it determines a detail level at which to show the managed resource data within the performance view 166, or receives modification to a view modifier 170-N.

In step 215, the network management information process 140-2 presents the performance details associated with the alert 164 in a performance view 166. The performance view 166 includes a topology region 167 identifying a location of the managed resource 161 experiencing the alert 164 within the storage area network 120, and a graph region 168 identifying the alert 164 in relation to managed resource data for the managed resource 161 experiencing the alert 164.

In step 216, the network management information process 140-2 determines a detail level at which to display managed resources 161 within the performance view 166. The detail level is determined from performance details associated with the selected alert 164. That is, the network management information process 140-2 determines the most relevant detail level based on the selected alert 164.

In step 217, the network management information process 140-2 displays a plurality of selectable managed resource data 174 associated with the managed resource 161 at the determined detail level. For example, the network management information process 140-2 displays a plurality of selectable managed resource data 174 within the topology region 167. At least one of the plurality of selectable managed resource data 174 can be selected to 'drill down' and view more details. The network management information process 140-2 determines the most relevant detail level (based on the selected alert 164) and displays that detail level. This saves the user 108 the steps of having to a) determine the most relevant detail level, and b) navigate to that detail level.

In step 218, the network management information process 140-2 graphically displays connectivity 177 between the plurality of selectable managed resource data 174 associated with the managed resource 161. In other words, the network management information process 140-2 determines the appropriate detail level, displays the plurality of selectable managed resource data 174 associated with the managed resource 161 at the determined detail level, and then graphically displays the connectivity 177 connecting those selectable managed resource data 174 associated with the managed resource 161.

Alternatively, in step 219, the network management information process 140-2 receives modification to a view modifier 170-N relevant to at least one of the topology region 167 and the graph region 168. For example, a user 108 changes one of the view modifiers 170-N.

In response, in step 220, the network management information process 140-2 updates the topology region 167 and the graph region 168 to account for the modification of the view modifier 170-N. For example, a user 108 changes the data in the "Date" view modifier 170-3 to create a graphical depiction 178 that occurred on a new date. The network management information process 140-2 updates the graph region 168 with a new graphical depiction 178 related to this new date, and updates the topology region 167 to reflect the new data presented in graph region 178.

Figure 8:
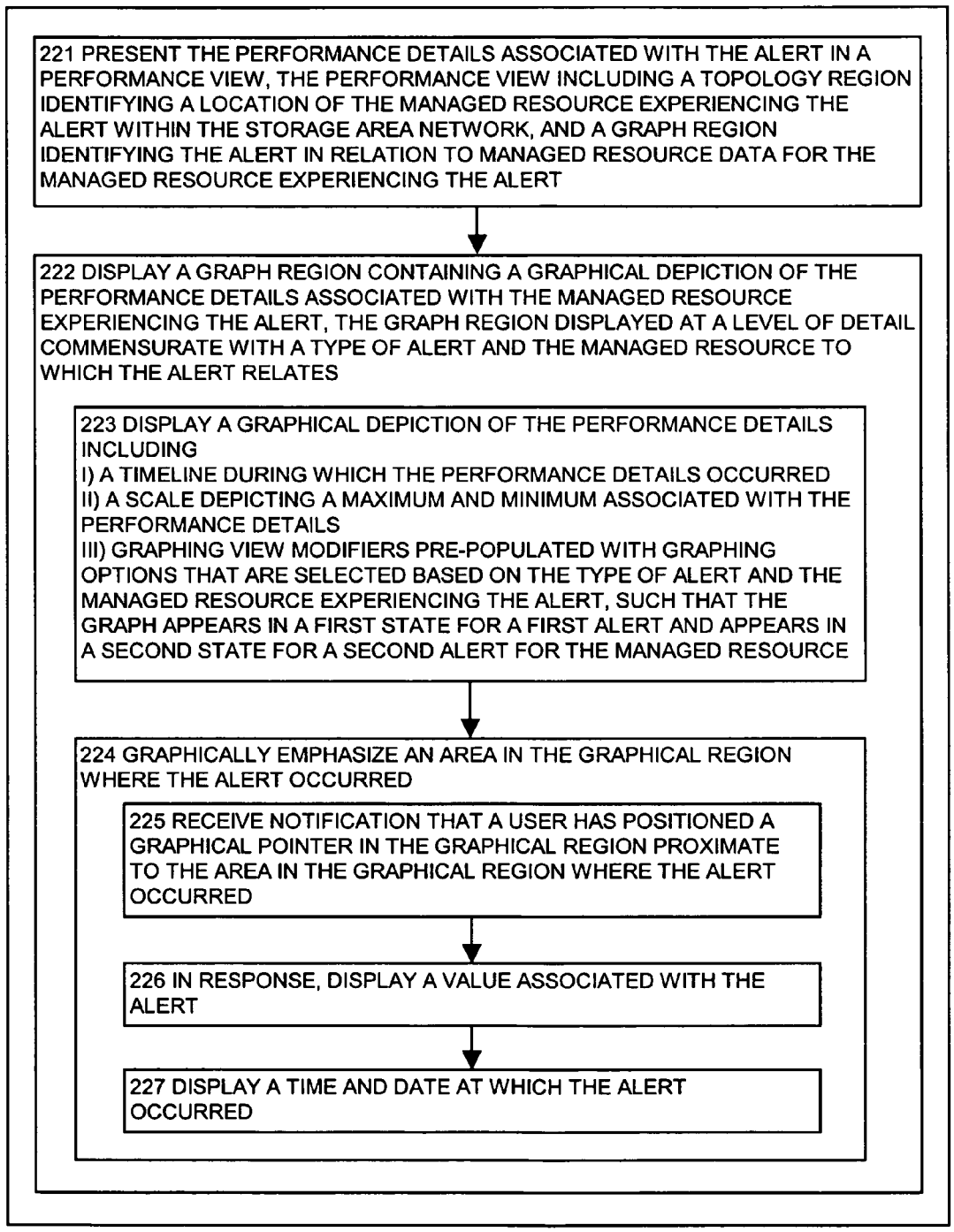
FIG. 8 illustrates a flowchart of a procedure performed by the system of FIG. 1 when the network management information process presents the performance details associated with the alert in a performance view, according to one embodiment disclosed herein.

FIG. 8 is a flowchart of the steps performed by the network management information process 140-2 when it displays a graphical depiction 178 of the performance details within the graph region 168.

In step 221, the network management information process 140-2 presents the performance details associated with the alert 164 in a performance view 166. The performance view 166 includes a topology region 167 identifying a location of the managed resource 161 experiencing the alert 164 within the storage area network 120, and a graph region 168 identifying the alert 164 in relation to managed resource data for the managed resource 161 experiencing the alert 164.

In step 222, the network management information process 140-2 displays a graph region 168 containing a graphical depiction 178 (i.e., a graph) of the performance details associated with the managed resource 161 experiencing the alert 164. The graph region 168 is displayed at a level of detail commensurate with a type of alert 164 and the managed resource 161 to which the alert 164 relates.

In step 223, the network management information process 140-2 displays a graphical depiction 178 of the performance details. The graphical depiction 178 includes a timeline 180 during which the performance details occurred, and a scale 181 depicting a maximum and minimum associated with the performance details. The graphical depiction 178 also includes graphing view modifiers 170-N pre-populated with graphing options that are selected based on the type of alert 164, and the managed resource 161 experiencing the alert 164, such that the graphical depiction 178 appears in a first state for a first alert and appears in a second state for a second alert for the managed resource 161. In other words, the graphical depiction 178 is refreshed for each modification to the view modifiers 170-N, and the graphical depiction 178 may be modified based on the changes to the view modifiers 170-N.

In step 224, the network management information process 140-2 graphically emphasizes an area 182 in the graphical region where the alert 164 occurred. In an example configuration, there is a 'x' on the graphical depiction 178 signifying where the alert 164 occurred.

In step 225, the network management information process 140-2 receives notification that a user 108 has positioned a graphical pointer in the graphical region 168 proximate to the area 182 in the graphical region 178 where the alert 164 occurred. In an example configuration, a user 108 places a mouse over the area 182 in the graphical region 178 where the alert 164 occurred.

In response, in step 226, the network management information process 140-2 displays a value associated with the alert 164. For example, if the alert 164 related to a value of "IO per second" (i.e., the input and output per second), the value associated with the alert would be the value of IO per second at the time of the alert 164.

In step 227, the network management information process 140-2 displays a time and date at which the alert 164 occurred. In other words, a user 108 places a mouse over the area 182 in the graphical region 178 where the alert 164 occurred, and the graph region 167 displays the value at the time of the alert 164 and the timestamp of when the alert 164 occurred.

Figure 9:
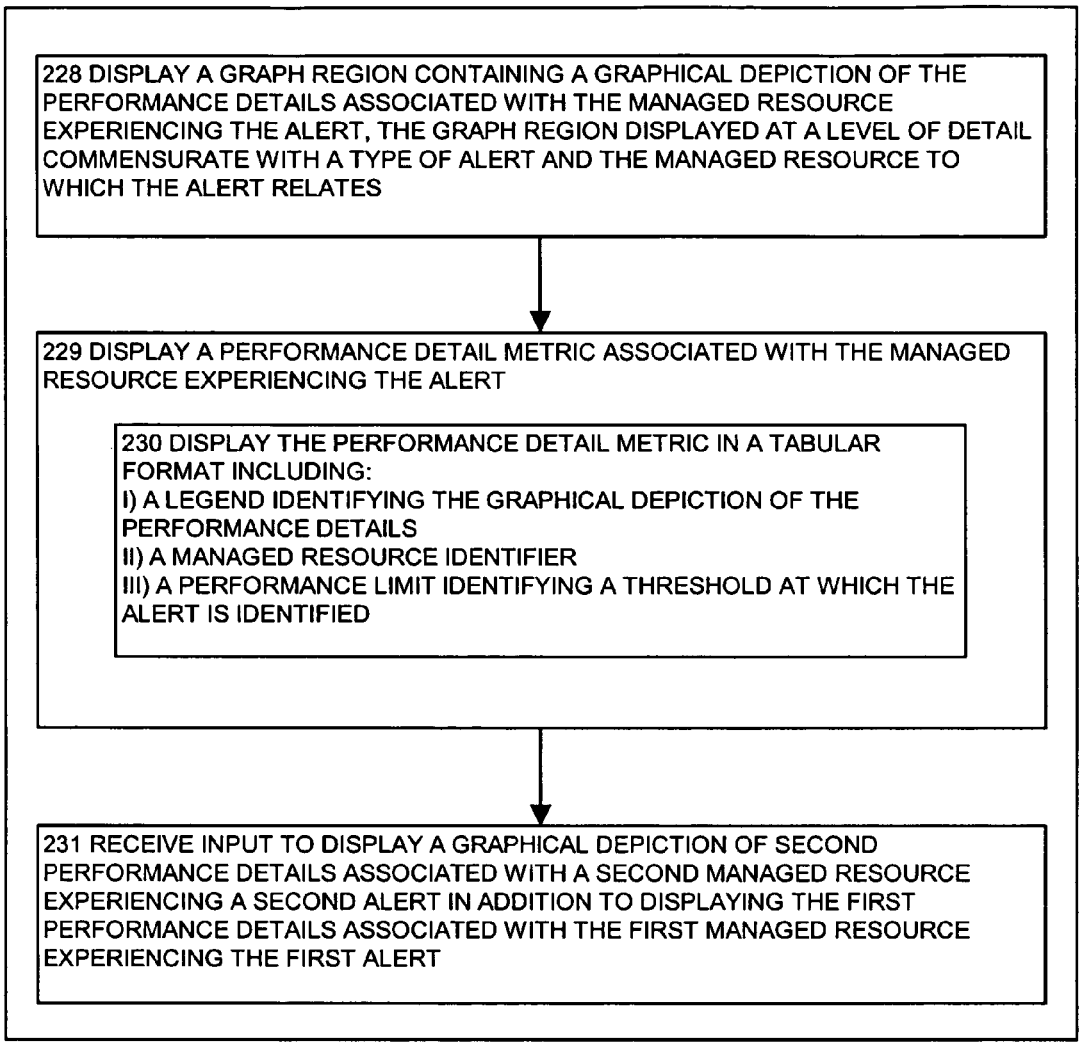
FIG. 9 illustrates a flowchart of a procedure performed by the system of FIG. 1 when the network management information process displays a graph region containing a graphical depiction of the performance details associated with the managed resource experiencing the alert, according to one embodiment disclosed herein.

FIG. 9 is a flowchart of the steps performed by the network management information process 140-2 when it displays a performance metric 179 in the graph region 168 and displays performance details related to a second managed resource.

In step 228, the network management information process 140-2 displays a graph region 168 containing a graphical depiction 178 (i.e., a graph) of the performance details associated with the managed resource 161 experiencing the alert 164. The graph region 168 is displayed at a level of detail commensurate with a type of alert 164 and the managed resource 161 to which the alert 164 relates.

In step 229, the network management information process 140-2 displays a performance detail metric 179 associated with the managed resource 161 experiencing the alert 164. The performance detail metric 179 supplies additional information associated with the alert 164.

In step 230, the network management information process 140-2 displays the performance detail metric 179 in a tabular format. The performance detail metric 179 includes a legend 183 identifying the graphical depiction 178 of the performance details, a managed resource identifier 184, and a performance limit 185 identifying a threshold at which the alert 164 is identified. The performance limit 185 is a pre-determined threshold for the managed resource 161. Once the managed resource 161 exceeds this threshold, the alert 164 is triggered.

In step 231, the network management information process 140-2 receives input to display a graphical depiction 178 of second performance details associated with a second managed resource experiencing a second alert, in addition to displaying the first performance details associated with the first managed resource experiencing the first alert. In an example configuration, a user 108 can select an "Add" button and add another alert 164 to the graphical depiction 178 such that the graphical depiction 178 displays two graphs related to two alerts.

Figure 10:
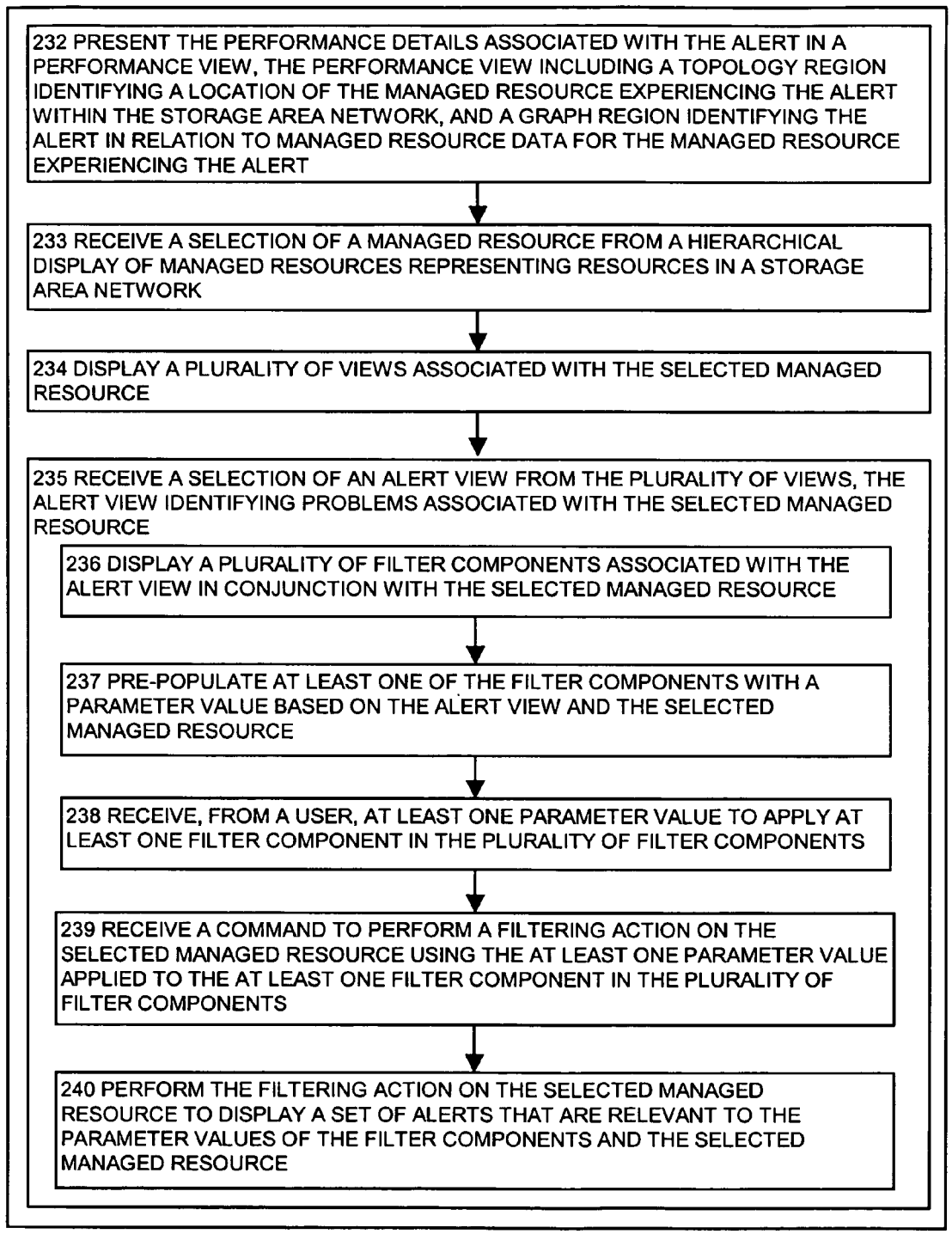
FIG. 10 illustrates a flowchart of a procedure performed by the system of FIG. 1 when the network management information process presents the performance details associated with the alert in a performance view, according to one embodiment disclosed herein.

FIG. 10 is a flowchart of the steps performed by the network management information process 140-2 when it receives the selection of the managed resource 161 from a hierarchical display 187.

In step 232, the network management information process 140-2 presents the performance details associated with the alert 164 in a performance view 166. The performance view 166 includes a topology region 167 identifying a location of the managed resource 161 experiencing the alert 164 within the storage area network 120, and a graph region 168 identifying the alert 164 in relation to managed resource data for the managed resource 161 experiencing the alert 164.

In step 233, the network management information process 140-2 receives a selection of a managed resource 161 from a hierarchical display 187 of managed resources representing resources in a storage area network 120. In an example configuration, a user 108 selects a managed resource 161 from a hierarchical display 187.

In step 234, the network management information process 140-2 displays a plurality of views 163 associated with the selected managed resource 161. In an example configuration, those views 163 can be a configuration view, a topology view, a path details view, a task list view, and an alerts view 165.

In step 235, the network management information process 140-2 receives a selection of an alert view 165 from the plurality of views 163. The alert view 165 identifies problems associated with the selected managed resource 161.

In step 236, the network management information process 140-2 displays a plurality of filter components 188 associated with the alert view 165 in conjunction with the selected managed resource 161. The filter components 188 are used to specify criteria by which to filter the alerts 164 to display within the alert view 165.

In step 237, the network management information process 140-2 pre-populates at least one of the filter components 188 with a parameter value 189 based on the alert view 165 and the selected managed resource 161. Parameter values 189 of the filter components 188 are identified, and those parameter values 189 are applied to alerts 164 associated with the managed resource 161 to filter the alerts 164 to display only those alerts 164 that match the parameter values 189 chosen for the filter components 188. The filtered results (including filtered alerts 164) are displayed in the alert view 165.

In step 238, the network management information process 140-2 receives, from a user 108, at least one parameter value 189 to apply at least one filter component 188 in the plurality of filter components. A user 108 specifies a parameter value 189 by which to filter the alerts 164 related to the selected managed resource 161.

In step 239, the network management information process 140-2 receives a command to perform a filtering action on the selected managed resource 161 using the parameter value 189 applied to the filter component 188. In other words, a user 108 selected a 'Filter' button to perform filtering on the set of alerts 164 related to the selected managed resource 161.

In step 240, the network management information process 140-2 performs the filtering action on the selected managed resource 161 to display a set of alerts 164 that are relevant to the parameter values 189 of the filter components 188 and the selected managed resource 161. In an example configuration, the set of filtered alerts 164 is displayed within the alerts view 165, along with information related to the type of alert and a time stamp of when the alert occurred.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method for presenting network management information to a user in a graphical user interface in which a computer system performs operations comprising:
   displaying a set of alerts in an alert view, each alert indicating a problem associated with a managed resource operating in a storage area network;
   receiving a first user selection of a first alert from the alert view;
   performing an analysis of managed resource data associated with the managed resource experiencing the first alert to identify performance details concerning the first alert in relation to the managed resource data; and
   presenting the performance details associated with the first alert in a performance view, the performance view including:
      i) a topology region identifying a location of the managed resource experiencing the first alert within the storage area network; and
      ii) a graph region identifying the first alert in relation to managed resource data for the managed resource experiencing the first alert;
   wherein presenting the performance details associated with the first alert in a performance view further comprises:
      determining a view modifier to select based on the first alert, wherein determining a view modifier to select based on the first alert includes, prior to rendering the performance view, automatically identifying a first time interval ideal for representing first managed resource data, the first managed resource data associated with a managed resource experiencing a problem indicated by the first alert;
      rendering the performance view displaying the selected view modifier, wherein rendering the performance view displaying the selected view modifier comprises:
         i) scaling a representation of the first managed resource data in the performance view in accordance with the first time interval; and
         ii) rendering the representation of the first managed resource data in the performance view;
   receiving a second user selection of a second alert from the set of alerts;
   receiving a third user selection of a second time interval, the first time interval different than the second time interval;
   scaling a representation of second managed resource data in accordance with the second time interval, the second managed resource data associated with a managed resource experiencing a problem indicated by the second alert;

replacing the representation of the first managed resource data rendered in the performance view with a rendering of the representation of the second managed resource data in accordance with the second time interval; and applying the view modifier to render an appropriate topology region and graph region.

2. The computer-implemented method of claim 1 wherein presenting the performance details associated with the first alert in a performance view comprises:

displaying a selectable view region exhibiting a plurality of views available to the user; and displaying a view modifier region presenting view modifiers available to the user, the view modifiers providing performance details associated with the managed object selection.

3. The computer-implemented method of claim 2 wherein displaying a view modifier region presenting view modifiers available to the user comprises:

providing a selectable host option to display hosts associated with the managed object selection;

providing a selectable connectivity option to display connectivity between a plurality of resources associated with the managed object selection; and providing a selectable storage option to display storage resources associated with the managed object selection.

4. The computer-implemented method of claim 3 further comprising, based on the selection of the first alert from the alert view and the managed resource experiencing the first alert, pre-populating the selectable host option, the selectable connectivity option and the selectable storage option.

5. The computer-implemented method of claim 1 wherein presenting the performance details associated with the first alert in a performance view, the performance view including a topology region identifying a location of the managed resource experiencing the first alert within the storage area network, comprises:

determining a detail level at which to display managed resources within the performance view, the detail level determined from performance details associated with the first alert;

displaying a plurality of selectable managed resource data associated with the managed resource at the determined detail level; and graphically displaying connectivity between the plurality of selectable managed resource data associated with the managed resource.

6. The computer-implemented method of claim 1 wherein presenting the performance details associated with the first alert in a performance view comprises:

receiving modification to a view modifier relevant to at least one of the topology region and the graph region; and in response, updating the topology region and the graph region to account for the modification of the view modifier.

7. The computer-implemented method of claim 1 wherein presenting the performance details associated with the first alert in a performance view, comprises:

displaying a graph region containing a graphical depiction of the performance details associated with the managed resource experiencing the first alert, the graph region displayed at a level of detail commensurate with a type of alert and the managed resource to which the first alert relates; and displaying a performance detail metric associated with the managed resource experiencing the first alert.

8. The computer-implemented method of claim 7 wherein displaying a graph region containing a graphical depiction of the performance details associated with the managed resource experiencing the first alert, the graph region displayed at a level of detail commensurate with a type of alert and the managed resource to which the first alert relates, comprises:

displaying a graphical depiction of the performance details including:

i) a timeline during which the performance details occurred;

ii) a scale depicting a maximum and minimum associated with the performance details; and iii) graphing view modifiers pre-populated with graphing options that are selected based on the type of alert and the managed resource experiencing the first alert, such that the graphical depiction appears in a first state for the first alert and appears in a second state for the second alert for the managed resource; and graphically emphasizing an area in the graphical region where the first alert occurred;

wherein displaying a performance detail metric associated with the managed resource experiencing the first alert comprises:

displaying the performance detail metric in a tabular format including:

i) a legend identifying the graphical depiction of the performance details;

ii) a managed resource identifier; and iii) a performance limit identifying a threshold at which the first alert is identified.

9. The computer-implemented method of claim 8, wherein the performance details associated with the managed resource experiencing the first alert include first performance details associated with a first managed resource experiencing the first alert, further comprising receiving input to display a graphical depiction of second performance details associated with a second managed resource experiencing the second alert in addition to displaying the first performance details associated with the first managed resource experiencing the first alert.

10. The computer-implemented method of claim 1 comprising:

receiving a selection of a managed resource from a hierarchical display of managed resources representing resources in a storage area network;

displaying a plurality of views associated with the selected managed resource; and receiving a selection of an alert view from the plurality of views, the alert view identifying problems associated with the selected managed resource.

11. The computer-implemented method of claim 10 wherein receiving a selection of an alert view from the plurality of views, the alert view identifying problems associated with the selected managed resource comprises:

displaying a plurality of filter components associated with the alert view in conjunction with the selected managed resource;

pre-populating at least one of the filter components with a parameter value based on the alert view and the selected managed resource; and receiving, from the user, at least one parameter value to apply at least one filter component in the plurality of filter components.

12. The computer-implemented method of claim 11 comprising:

receiving a command to perform a filtering action on the selected managed resource using the at least one parameter value applied to the at least one filter component in the plurality of filter components; and performing the filtering action on the selected managed resource to display a set of alerts that are relevant to the parameter values of the filter components and the selected managed resource.

13. The computer-implemented method of claim 1 wherein performing an analysis of managed resource data associated with the managed resource comprises:

identifying a type of alert associated with the first alert selected from the alert view;

determining a type of analysis action to perform on the managed resource data associated with the managed resource, the type of analysis action based on the type of alert; and providing a user with an option to perform the analysis action.

14. The computer-implemented method of claim 1 wherein receiving a first user selection of a first alert from the alert view comprises enabling an analysis action providing additional analysis details associated with the first alert, the enabled analysis action based on a type of alert displayed within the alert view.

15. The computer-implemented method of claim 1 further comprising:

receiving a second time interval selected by the user, the second time interval different than the first time interval; and in the performance view, scaling the representation of the first managed resource data in the performance view in accordance with the second time interval.

16. The computer-implemented method of claim 15 further comprising:

upon detecting selection of a second user-selected alert from the set of alerts, automatically identifying a second time interval ideal for representing second managed resource data, the second managed resource data associated with a managed resource experiencing a problem indicated by the second user-selected alert, the first time interval different than the second time interval;

scaling a representation of the second managed resource data in accordance with the second time interval; and replacing a display of the representation of the first managed resource data in the performance view with a display of the representation of the second managed resource data in accordance with the second time interval.

17. The computer-implemented method of claim 15 further comprising:

receiving a second time interval selected by the user, the second time interval different than the first time interval;

in the performance view, scaling the representation of the first managed resource data in the performance view in accordance with the second time interval;

upon detecting selection of a second user-selected alert from the set of alerts, automatically identifying a third time interval ideal for representing second managed resource data, the second managed resource data associated with a managed resource experiencing a problem indicated by the second user-selected alert, the third time interval different than the first time interval and the second time interval;

scaling a representation of the second managed resource data in accordance with the third time interval; and replacing a display of the representation of the first managed resource data in the performance view with a display of the representation of the second managed resource data in accordance with the third time interval.

18. A computerized device comprising:

a memory;

a processor;

a communications interface;

an interconnection mechanism coupling the memory, the processor and the communications interface;

wherein the memory is encoded with a network management information application that, when executed on the processor, presents network management information to a user in a graphical user interface on the computerized device by causing the computerized device to perform the operations of:

displaying a set of alerts in an alert view, each alert indicating a problem associated with a managed resource operating in a storage area network;

receiving a first user selection of a first alert from the alert view;

performing an analysis of managed resource data associated with the managed resource experiencing the first alert to identify performance details concerning the first alert in relation to the managed resource data; and presenting the performance details associated with the first alert in a performance view, the performance view including:

i) a topology region identifying a location of the managed resource experiencing the first alert within the storage area network; and ii) a graph region identifying the first alert in relation to managed resource data for the managed resource experiencing the first alert;

wherein presenting the performance details associated with the first alert in a performance view further comprises:

determining a view modifier to select based on the first alert, wherein determining a view modifier to select based on the first alert comprises, prior to rendering the performance view, automatically identifying a first time interval ideal for representing first managed resource data, the first managed resource data associated with a managed resource experiencing a problem indicated by the first alert;

rendering the performance view displaying the selected view modifier, wherein rendering the performance view displaying the selected view modifier comprises:

i) scaling a representation of the first managed resource data in accordance with the first time interval; and ii) rendering the representation of the first managed resource data in the performance view;

receiving a second user selection of a second alert from the set of alerts;

receiving a third user selection of a second time interval, the first time interval different than the second time interval;

scaling a representation of second managed resource data in accordance with the second time interval, the second managed resource data associated with a managed resource experiencing a problem indicated by the second alert;

replacing the representation of the first managed resource data rendered in the performance view with a rendering of the representation of the second managed resource data in accordance with the second time interval; and applying the view modifier to render an appropriate topology region and graph region.

19. The computerized device of claim 18 wherein the network management information application further causes the computerized device to perform the operations of:

determining a detail level at which to display managed resources within the performance view, the detail level determined from performance details associated with the first alert;

displaying a plurality of selectable managed resource data associated with the managed resource at the determined detail level; and graphically displaying connectivity between the plurality of selectable managed resource data associated with the managed resource.

20. The computerized device of claim 19 wherein the network management information application further causes the computerized device to perform the operations of:

displaying a graph region containing a graphical depiction of the performance details associated with the managed resource experiencing the first alert, the graph region displayed at a level of detail commensurate with a type of alert and the managed resource to which the first alert relates;

displaying a graphical depiction of the performance details including:

i) a timeline during which the performance details occurred;

ii) a scale depicting a maximum and minimum associated with the performance details; and iii) graphing view modifiers pre-populated with graphing options that are selected based on the type of alert and the managed resource experiencing the first alert, such that the graphical depiction appears in a first state for the first alert and appears in a second state for the second alert for the managed resource; and graphically emphasizing an area in the graphical region where the first alert occurred; and displaying a performance detail metric associated with the managed resource experiencing the first alert, wherein displaying a performance detail metric associated with the managed resource experiencing the first alert comprises:

displaying the performance detail metric in a tabular format including:

i) a legend identifying the graphical depiction of the performance details;

ii) a managed resource identifier; and iii) a performance limit identifying a threshold at which the first alert is identified.

21. A non-transitory computer readable storage medium encoded with computer programming logic stored thereon that, when executed by a processor in a computerized device, produces a network management information process that presents network management information to a user in a graphical user interface by causing the computerized device to perform the operations of:

displaying a set of alerts in an alert view, each alert indicating a problem associated with a managed resource operating in a storage area network;

receiving a first user selection of a first alert from the alert view;

performing an analysis of managed resource data associated with the managed resource experiencing the first alert to identify performance details concerning the first alert in relation to the managed resource data; and presenting the performance details associated with the first alert in a performance view, the performance view including:

i) a topology region identifying a location of the managed resource experiencing the first alert within the storage area network; and ii) a graph region identifying the first alert in relation to managed resource data for the managed resource experiencing the alert;

wherein the presenting the performance details associated with the first alert in a performance view further comprises:

determining a view modifier to select based on the first alert, wherein determining the view modifier to select based on the first alert comprises, prior to rendering the performance view, automatically identifying a first time interval ideal for representing first managed resource data, the first managed resource data associated with a managed resource experiencing a problem indicated by the first alert;

rendering the performance view displaying the selected view modifier, wherein rendering the performance view displaying the selected view modifier comprises:

i) scaling a representation of the first managed resource data in accordance with the first time interval; and ii) rendering the representation of the first managed resource data in the performance view;

receiving a second user selection of a second alert from the set of alerts;

receiving a third user selection of a second time interval, the first time interval different than the second time interval;

scaling a representation of second managed resource data in accordance with the second time interval, the second managed resource data associated with a managed resource experiencing a problem indicated by the second alert;

replacing the representation of the first managed resource data rendered in the performance view with a rendering of the representation of the second managed resource data in accordance with the second time interval; and applying the view modifier to render an appropriate topology region and graph region.

* * * * *